Figure 2:
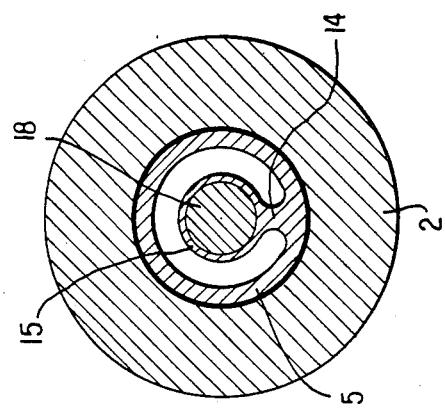

United States Patent [19]

Biester

[11] Patent Number: 4,809,750
[45] Date of Patent: Mar. 7, 1989

[54] PRESSURE REDUCTION ARRANGEMENT

[75] Inventor: Klaus Biester, Wienhausen, Fed. Rep. of Germany

[73] Assignee: Cameron Iron Works GmbH, Celle, Fed. Rep. of Germany

[21] Appl. No.: 129,312

[22] Filed: Nov. 16, 1987

Related U.S. Application Data

[63] Continuation of Ser. No. 800,222, Nov. 13, 1985, abandoned which is a continuation-in-part of PCT/EP85/00102, Mar. 14, 1985, published as WO85/04231, Sep. 26, 1985.

[30] Foreign Application Priority Data

Mar. 19, 1984 [DE] Fed. Rep. of Germany ....... 3409973

[51] Int. Cl.$^4$ .............................................. F15D 1/00
[52] U.S. Cl. ........................................ 138/45; 251/903
[58] Field of Search ................. 138/41, 43, 45, 46; 251/63.5, 121, 122, 190, 324, 325, 339, 360, 903

[56] References Cited

U.S. PATENT DOCUMENTS 2,628,638  2/1953  Herod et al. .................... 251/360 X

FOREIGN PATENT DOCUMENTS 1194431  11/1959  France .

Primary Examiner—Stephen Marcus
Attorney, Agent, or Firm—Spencer & Frank

[57] ABSTRACT

A combination composed of a conduit for conveying a fluid medium along a linear path under very high pressure and a choke disposed in the conduit, the conduit having an inner wall and the choke being composed of a restrictor having a restrictor opening which is constricted relative to the cross section of the conduit and a movable needle mounted for movement in the direction of the linear path for constricting or closing the restrictor opening. The conduit is made of a material capable of withstanding the high pressures exerted on the inner wall of the conduit by the flowing medium and the choke is made of a very hard and brittle material which is resistant to wear. The choke further includes a central insert member having an outer tubular part fastened to the inner wall of the conduit, an inner part supporting the needle within the conduit so that fluid medium flowing through the conduit flows around the needle, and a member connecting the inner part to the outer part. The needle is supported by the inner part for movement relative to the inner part parallel to the linear path. The choke further includes a hydraulic drive unit supported by the inner part and forming a unit with the needle. The central insert member is configured and fastened to the inner wall of the conduit so as to offer only slight resistance to flow of the fluid medium past the central insert member.

24 Claims, 1 Drawing Sheet

PRESSURE REDUCTION ARRANGEMENT

CROSS REFERENCE TO RELATED APPLICATION

This application is a continuation of application Ser. No. 800,222, filed Nov. 13, 1985, now abandoned, which is a continuation-in-part of copending International Application PCT/EP85/00102 filed Mar. 14, 1985 now WO85/04231, published Sept. 26, 1985, which designates the United States of America and claims the priority of application Ser. No. P 34 09 973.5 filed in the Federal Republic of Germany on Mar. 19, 1984.

The invention relates to a throttling member, or choke, for reducing the pressure in a conveying conduit subject to very high pressures, the member including a restrictor which is constricted relative to the cross section of the conduit and a movable needle for constricting or closing the restrictor opening.

Throttling members are devices for regulating the rate of influx of liquids, gases and/or mixtures of solids and contain apertures (restrictors) which are constricted relative to the cross section of the conveying conduit. Throttling members are known in which the restrictor is disposed in a bend of the conduit in such a manner that the restrictor redirects the direction of flow by 90° with respect to the direction of flow of the conveying conduit. In this way, a needle for constricting or closing the restrictor opening can be adjusted externally through the walls of the conveying conduit. The adjustment mechanism is here arranged perpendicularly to the inlet side of the conveying conduit. These known throttling members are manufactured as individual components which can be inserted into the conduit system. They have been found satisfactory, for example, in drilling operations and are suitable for manual operation as well as for automatic or remote controlled operation.

Due to the very high pressure of, e.g. 10.5 MPa (=15,000 psi=1050 bar) existing in the conveying conduits and due to the particular composition of the materials being conveyed, which may, for example, be oil and sand mixtures, the throttling members, particularly their restrictors and the needle, are subjected to extreme wear. This wear, and thus the frequency at which damaged parts are exchanged is reduced by the selection of particularly resistant materials. However, it is nevertheless undesirably high.

It is the object of the invention to further reduce wear. Moreover, the strength of the throttling member against the very high pressures is to be improved and the frequency of exchanges is to be reduced. This is accomplished by the invention as defined in claim 1. Further features of the invention are defined in the dependent claims.

The invention is based on the realization that the materials for throttling member and conveying conduit must meet different requirements and that the great wear is caused by the material being conveyed which impacts on one side of the surface of the needle and thus wear this surface off. In the solution provided by the invention, the needle is principally placed in the axial direction of the flow of conveyed material and the material being conveyed therefore flows around it. The tip of the needle is directed opposite to the direction of conveyance and thus offers only a small area of attach for the material being conveyed. For the selection of the material for the conveying conduit, a material is optimum which is able to withstand high pressures, is tough and not brittle, such as highly touch special steels. For the throttling member, however, a very hard and thus brittle material, such as hardened special steel or sintered metal, is more wear resistant. Therefore, for the system as a whole, the insertion of the wear resistant throttling unit into a conveying conduit of pressure resistant material results in an addition of the advantages and avoidance of the drawbacks of the individual materials.

To explain the invention in greater detail, one embodiment thereof will be described below with reference to the drawings. These drawings show in FIG. 1, a longitudinal sectional view of a throttling member according to the invention;

FIG. 2, a cross-sectional view of the throttling member.

Figure 3:
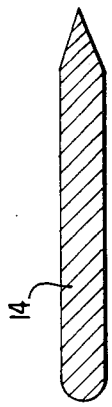

FIG. 3, a sectional view of an attenative web member.

Figure 1:
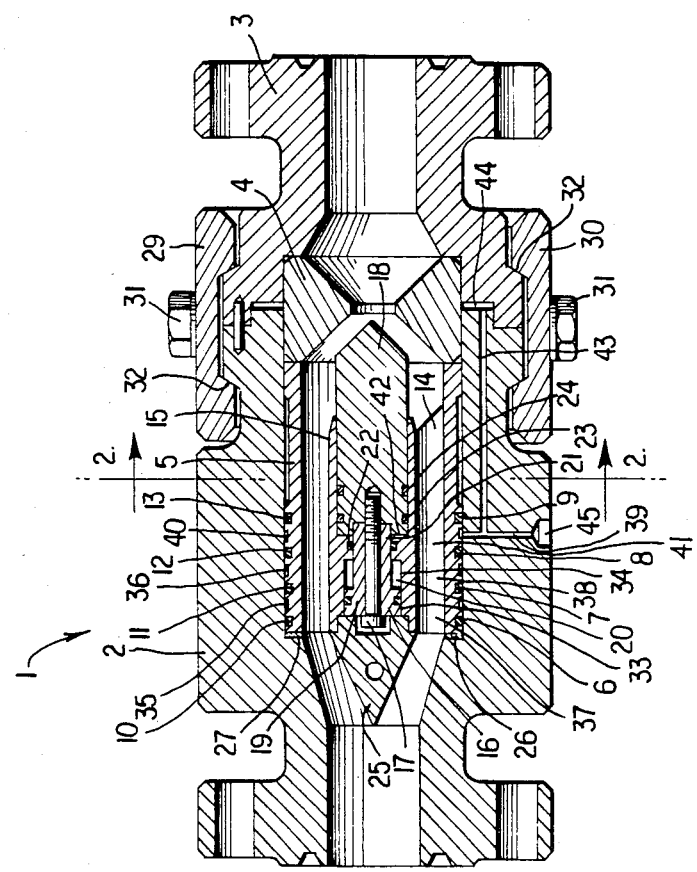

FIG. 1 shows a throttling member of an indicated conveying conduit 1. The throttling member is composed of a pipe body 2 and an end member 3 which both together enclose a restrictor 4 and a central insert 5. Central insert 5 is composed of a tubular part whose outer walls are adapted to the inner walls of pipe body 2 and is sealed thereagainst by annular sealing rings 6, 7, 8, 9. The annular seals have a rectangular cross section and are disposed in grooves 10, 11, 12, 13 in the outer wall of central insert 5. The interior of central insert 5 is provided with a web 14 which, at its side facing the flow, is sloped on both sides similarly to the bow of a ship and thus poses only slight resistance to the flow. The side of web 14 facing away from the flow is rounded in a flow enhancing manner. Rigidly connected with web 14, particularly made of one piece with the web, is the stationary member 15 of a hydraulic drive including hydraulic piston 16 to which a needle 18 is fastened by means of a screw 17. Needle 18 is centered in tubular body 2 so that the flow of material goes uniformly around it and it poses only a slight resistance to such flow. Hydraulic piston 16 has two different diameter regions which are accommodated in two chambers having correspondingly different diameters in stationary member 15 of the hydraulic drive. Piston region 19, which has the larger diameter, is accommodated in a hydraulic chamber 20 of corresponding diameter. The length of hydraulic chamber 20 is as much greater as is the length of the piston region 19 accommodated in it so that needle 18 is able to perform a stroke between closing and maximum opening of restrictor 4. Piston region 21, which has the smaller diameter, is of such a length that it can be brought sufficiently through the corresponding chamber 22. Needle 18 which is fastened to the front end of piston 16 is guided in stationary portion 15 and is sealed from this portion by means of two annular seals 23, 24.

At its rearward termination, hydraulic chamber 20 is closed and sealed by a screw cap 25. At its outer side, this cap 25 is given a flow enhancing termination so that the entire hydraulic drive with web 14 poses only slight resistance against the flow and thus is worn only relatively slightly. Central insert 5 is inserted into pipe body 2 in such a manner that it is separated from the rear shoulder 26 of pipe body 2 by means of a seal 27 of soft iron. After assembly of pipe body 2 with restrictor 4 and central insert 5, pipe body 2 is connected with end member 3. The connection of pipe body 2 and end member 3 is done by means of clamping jaws 29, 30, which surround the circumference of both members 2, 3 and are compressed outside the region of the pipe by a screw connection 31. Due to the slope sides 32, this compression causes both bodies 2, 3 to be compressed and at the same time restrictor 4 is pressed against central insert 5 and the latter is pressed against soft iron ring 27. In this way, a firm unit is realized and also a system which is tight under the high pressures of drilling hole operation. To drive hydraulic piston 16, hydraulic conduits 33, 34 are brought through the walls of pipe body 2 and through web 14 which connects the walls of the pipe body and central inset 5. Conduits 33, 34 end in annular grooves 35, 36 at the inner wall of pipe body 2, with the grooves surrounding central insert 5 in such a manner that in every angular position of central insert 5 the hydraulic conduits 37, 38 provided in its walls end above grooves 35, 36. Thus no adjustment of the angular position of central unit 5 is required when the latter is installed because grooves 35, 36 act as connecting hydraulic conduits. A further hydraulic conduit 39 is brought through the walls of pipe body 2 to an annular groove 40 in the interior of the wall, with this conduit surrounding central insert 5 at the point at which a hydraulic conduit 41 passing through the wall of central insert 5 ends at the rear end 42 of the area surrounding and accommodating needle 18. Of hydraulic conduits 33, 34 and 39, only the latter is visible, since the conduits are offset with respect to one another by certain angles. Conduits 33, 34 are indicated by lines. A further hydraulic conduit 43 in pipe body 2 parallel to the direction of flow and extending to frontal face 44 below restrictor 4 serves to remove pressure in case seals 6, 7, 8, 9 are untight. Outlet 45 of hydraulic conduit 39 is connected with an indicator (not shown) or an automatic control device which closes a valve or the like disposed in the course of conveying conduit 1 if a seal is damaged and pressure is released. A hole is provided in screw cap 25 to serve as handhold or point of attach for a tool for removing or attaching cap 25. Hydraulic conduits 33, 34 are each connected with an equalizing vessel (not shown) which takes up the excess liquid during movement of the piston. Central insert 5, web 14 and holder 15 are preferably made of one piece, with the shaping being effected by erosion, i.e. spark erosive removal of the metal parts which are not required. The cross sections of the conduit at every point except for restrictor 4 have such dimensions that the same cross-sectional area results for every cross section except restrictor 4. These dimensions further reduce wear. Restrictor 4 provides an opening and has two walls each extending to the restrictor opening, the two walls being in mirror symmetry with respect to a plane containing the restrictor opening. Due to this symmetry, it is possible to reverse the restrictor and reinsert it if one wall is worn. That means that restrictor 4 is worn uniformly and need not immediately be exchanged if one wall is worn. This possibility extends the service life of the throttling member. The flow may occur uniformly from one of the two sides. However, the arrangement here is such that restrictor 4 faces the flow inlet. The flanks forming the tip of needle 18 are dimensioned in such a way that they are approximately parallel to the walls of restrictor 4.

FIG. 2 is a cross-sectional view of FIG. 1 seen at that point at which pipe body 2, web 14 and central insert 5 as well as needle 18 are visible. Unit 5 is shown to be exchangeable. It is also possible, however, to press unit 5 firmly into pipe member 2 and to relinquish exchangeability.

I claim:

1. The combination comprising a conduit for conveying a fluid medium along a linear path under very high pressure and a choke disposed in said conduit, said conduit having an inner wall and said choke being composed of a restrictor having a restrictor opening which is constricted relative to the cross section of said conduit and a movable needle mounted for movement in the direction of the linear path for constricting or closing the restrictor opening, wherein:

said conduit is made of a material capable of withstanding the high pressures exerted on the inner wall of said conduit by the flowing medium;

said choke is made of a very hard and brittle material which is resistant to wear;

said choke further comprises: a central insert member having an outer tubular part fastened to the inner wall of said conduit, an inner part supporting said needle within said conduit so that fluid medium flowing through said conduit flows around said needle, and means connecting said inner part to said outer part, said needle being supported by said inner part for movement relative to said inner part parallel to the linear path; and hydraulic drive means supported by said inner part and forming a unit with said needle; and wherein said central insert member is configured and fastened to said inner wall of said conduit so as to offer only slight resistance to flow of the fluid medium past said central insert member; and said outer tubular part of said central insert member has an outer wall facing the inner wall of said conduit and provided with a plurality of annular grooves spaced apart along the linear path; and said combination further comprises a plurality of sealing rings each seated in a respective annular groove for preventing flow of the fluid medium between said outer wall of said tubular part and said inner wall of said conduit.

2. The combination according to claim 1 wherein said conduit is made of a highly tough special steel and said choke is made of a hardened special steel or a sintered metal.

3. The combination according to claim 1 wherein said means connecting said inner part to said outer part consist of a single web, and said hydraulic drive means comprise hydraulic fluid conduits extending through said web.

4. The combination according to claim 3 wherein said conduit has a flow inlet and a flow outlet between which said choke is disposed, and said web is bilaterally tapered at the side facing said flow inlet.

5. The combination according to claim 3 wherein said conduit has a flow inlet and a flow outlet between which said choke is disposed, and said web is rounded at the side facing said flow outlet.

6. The combination according to claim 1 wherein said choke is exchangeable.

7. The combination according to claim 1 wherein said restrictor is exchangeable and has two walls each extending to said restrictor opening, said two walls being in mirror symmetry with respect to a plane containing the restrictor opening, with one of said walls facing said needle and the other one of said walls facing away from said needle, said restrictor being selectively insertable into said conduit so that either one of said walls can face said needle.

8. The combination according to claim 1 wherein said hydraulic drive means comprise a hydraulic piston forming a separable unit with said needle and accommodated within said inner part of said central insert member.

9. The combination according to claim 8 wherein said hydraulic piston has two cylindrical portions having respectively different diameters, and said inner part of said central insert member defines two cylinder chambers each corresponding in shape to, and guiding, a respective piston portion, with the chamber corresponding to the larger diameter piston portion having a greater length than the larger diameter piston portion and serving as a hydraulic chamber.

10. The combination according to claim 9 wherein said hydraulic drive means comprise two hydraulic fluid conduits each communicating with a respective end of said hydraulic chamber.

11. The combination according to claim 1 wherein: said conduit has an outer surface and a first hydraulic passage extending between said outer surface and said inner wall at a location between two of said sealing rings to permit indication of untightness of one of said sealing rings.

12. The combination according to claim 11 wherein each of said sealing rings has a rectangular cross section.

13. The combination according to claim 11 wherein said conduit comprises a pipe member supporting said central insert part and said restrictor and having an end face, said pipe member having a second hydraulic passage extending between said end face and said first hydraulic passage.

14. The combination according to claim 1 wherein said restrictor has a wall facing said needle, and said needle has flanks forming a needle tip and extending essentially parallel to said restrictor wall.

15. The combination according to claim 1 wherein said inner part of said central insert member defines a hydraulic chamber forming part of said hydraulic drive means, and said choke further comprises a cap screwed to said inner part for closing said hydraulic chamber and provided with means for cooperating with a tool for effecting removal of said cap from said inner part.

16. The combination comprising a conduit for conveying a fluid medium along a linear path under very high pressure and a choke disposed in said conduit, said conduit having an inner wall and said choke being composed of a restrictor having a restrictor opening which is constricted relative to the cross section of said conduit and a movable needle mounted for movement in the direction of the linear path for constricting or closing the restrictor opening, wherein:
said conduit is made of a material capable of withstanding the high pressures exerted on the inner wall of said conduit by the flowing medium;
said choke is made of a very hard and brittle material which is resistant to wear;
said choke further comprises: a central insert member having an outer tubular part fastened to the inner wall of said conduit, an inner part supporting said needle within said conduit so that fluid medium flowing through said conduit flows around said needle, and means connecting said inner part to said outer part, said needle being supported by said inner part for movement relative to said inner part parallel to the linear path; and hydraulic drive means supported by said inner part and forming a unit with said needle; and wherein said central insert member is configured and fastened to said inner wall of said conduit so as to offer only slight resistance to flow of the fluid medium past said central insert member;

said restrictor is exchangeable and has two walls each extending to said restrictor opening, said two walls being in mirror symmetry with respect to a plane containing the restrictor opening, with one of said walls facing said needle and the other one of said walls facing away from said needle, said restrictor being selectively insertable into said conduit so that either one of said walls can face said needle;

said conduit has a flow inlet and a flow outlet between which said choke is disposed; said conduit comprises a pipe member having an end directed toward said flow inlet and in which said choke is inserted so that one end of said central insert member faces said flow outlet and said restrictor is directed toward said flow inlet, and a frontal member disposed at said end of said pipe member; and said combination further comprises a sealing ring of soft iron disposed at said one end of said central insert member, and a clamping member securing said frontal member to said pipe member.

17. The combination according to claim 16 wherein said clamping member comprises two parts which are screwed together for pressing said restrictor and said central insert member against said sealing ring.

18. The combination according to claim 16 wherein said conduit is made of a highly tough special steel and said choke is made of a hardened special steel or a sintered metal.

19. The combination according to claim 16 wherein said means connecting said inner part to said outer part consist of a single web, and said hydraulic drive means comprise hydraulic fluid conduits extending through said web.

20. The combination according to claim 19 wherein said web is bilaterally tapered at the side facing said flow inlet.

21. The combination according to claim 19 wherein said web is rounded at the side facing said flow outlet.

22. The combination according to claim 16 wherein said choke is exchangeable.

23. The combination according to claim 16 wherein said restrictor has a wall facing said needle, and said needle has flanks forming a needle tip and extending essentially parallel to said restrictor wall.

24. The combination according to claim 16 wherein said inner part of said central insert member defines a hydraulic chamber forming part of said hydraulic drive means, and said choke further comprises a cap screwed to said inner part for closing said hydraulic chamber and provided with means for cooperating with a tool for effecting removal of said cap from said inner part.

* * * * *